United States Patent [19]

Lemoine et al.

[11] Patent Number: 4,808,643

[45] Date of Patent: Feb. 28, 1989

[54] EPDM AND/OR EPR RUBBER/SILICONE COMPOSITIONS

[75] Inventors: Guy Lemoine, Le Havre; Robert Lucas, Montivilliers; Meyer Soria, Villeurbanne, all of France

[73] Assignees: Rhone-Poulenc Chimie, Courbevoie; Compagnie de Raffinage et de Distribution Total France, Levallois-Perret, both of France

[21] Appl. No.: 175,280

[22] Filed: Mar. 30, 1988

[30] Foreign Application Priority Data

Mar. 30, 1987 [FR] France .................... 87 04591

[51] Int. Cl.⁴ .................................... C08K 5/34
[52] U.S. Cl. ........................... 524/87; 524/92; 524/93; 524/254; 524/255
[58] Field of Search .............. 524/92, 87, 93, 255, 524/254

[56] References Cited

U.S. PATENT DOCUMENTS 4,376,184  3/1983  Itoh et al. .................... 524/492

FOREIGN PATENT DOCUMENTS 0040468  11/1981  European Pat. Off. .
56-116739  9/1981  Japan .
2019417  10/1979  United Kingdom .

*Primary Examiner*—Melvyn I. Marquis
*Attorney, Agent, or Firm*—Burns, Doane, Swecker & Mathis

[57] ABSTRACT

EPDM and/or EPR rubber/silicone compositions having improved thermal properties, well adapted for the production of a wide variety of useful shaped articles, e.g., automotive seals, gaskets and belts, include a 2-mercapto-benzimidazole or salt thereof, preferably the zinc salt, an antioxidant comprising a secondary amine function, a diorganopolysiloxane oil, appropriate filler material and a peroxide crosslinking catalyst.

10 Claims, No Drawings

EPDM AND/OR EPR RUBBER/SILICONE COMPOSITIONS

BACKGROUND OF THE INVENTION

1. Field of the Invention

The present invention relates to novel compositions of matter containing EPDM (ethylene-propylene-diene terpolymer) rubber and/or EPR (ethylene-propylene copolymer) rubber, and silicones, and to a variety of useful articles shaped therefrom.

2. Description of the Prior Art

Rubber/silicone compositions have long been known to this art. They were originally developed with a view towards producing a rubber having the good mechanical properties of organic rubbers and, at the same time, the good thermal behavior of the silicones. This combination of properties is necessary, in fact, for an increasing number of applications, among which electrical insulation and automotive uses are exemplary.

The conventionally employed crosslinking agents therefor are sulfur derivatives and/or an organic peroxide.

Representative prior art describing the use of organic peroxides as crosslinking agents includes:

U.S. Pat. No. 3,227,777 describing the combination EPR-vinylated organopolysiloxane oil or resin, crosslinked with peroxide;

U.S. Pat. No. 3,865,897 describing a method of mixing organic rubber and silicone by shearing at an elevated temperature in order to improve the compatibility of both constituents;

U.S. Pat. No. 4,234,702 (corresponding to GB-A-2,019,417) and EP-A-40,468 which suggest, in order to improve compatibility, adding a diorganopolysiloxane oil in which certain organic groups are notably alkyl radicals containing from 4 to 20 carbon atoms, hydroxyalkyl radicals and polyoxyalkylene radicals;

Japanese patent application KOKAI No. 81-116,739, the subject of which is a composition of:

(i) 100 parts of an EPR or EPDM rubber,
(ii) 1 to 150 parts of an organopolysiloxane resin,
(iii) 10 to 150 parts of a silica having a specific surface area greater than 50 m²/g,
(iv) 0.5 to 15 parts of 2-mercaptobenzimidazole,
(v) 0.5 to 15 parts of a phenolic antioxidant, and
(vi) 0.1 to 10 parts of an organic peroxide.

These prior art compositions constitute significant advances relative to the use of organic rubbers alone or of the silicones alone, but shortcomings remain, especially in the case of applications for the automotive industry (manufacture of a variety of articles, particularly of gaskets and belts).

Indeed, it has been determined that the known compositions exhibit, in particular, poor behavior on heat aging, resulting in the appearance of crazing and a considerable reduction in the elongation at break.

SUMMARY OF THE INVENTION

Accordingly, a major object of the present invention is the provision of improved rubber/silicone compositions, which novel compositions admirably combine the desirable end use and mechanical properties of the EPDMs and/or the EPRs with the good thermal characteristics of the silicones.

Another object of this invention is the provision of improved rubber/silicon compositions which exhibit good resistance to steam and ease of use of EPDMs and/or EPRs, in particular good consistency in the raw state ("green strength") which is an essential characteristic for the manufacture and handling of manufactured articles such as, for example, hoses for a motor vehicle.

Another oject of the present invention is the provision of compositions of the above type which exhibit the good thermal behavior of the silicone rubbers.

Still another object of this invention is the provision of compositions of the above type which exhibit good thermal behavior by conjoint use of a thermal protection system and a compatibilizing system.

Briefly, the present invention features improved rubber/silicone compositions of matter, comprising:

(A) 100 parts by weight of a mixture of:
($A_1$) 95 to 30 parts by weight of an ethylene-propylene-diene terpolymer and/or an ethylene-propylene copolymer,
($A_2$) 5 to 70 parts by weight of a diorgano-polysiloxane resin having a viscosity of at least $10^6$ mPa.s at 25° C.;
(B) 0.5 to 10 parts by weight of a compound of the formula:

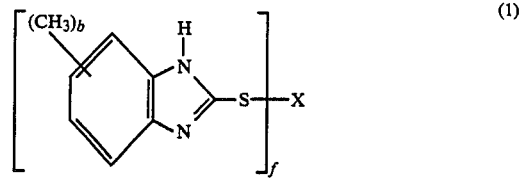

(1)

in which b=0 or 1, X is a metal cation or the hydrogen atom, f is an integer ranging from 1 to 3, inclusive, equal to the number of positive charges on the cation; f being equal to 1 when X is the hydrogen atom (aluminum, tellurium, nickel and zinc are exemplary of such metal cations; zinc is the preferred cation and in this case f=2);

(C) 0.1 to 10 parts by weight of an aromatic secondary amine compound;
(D) 5 to 200 parts by weight of an inorganic filler;
(E) 0.1 to 30 parts by weight of a diorganopoly-siloxane oil having a viscosity of from 10 to 5,000 mPa.s at 25° C. in which the organic radicals are selected from among methyl, vinyl, phenyl and 3,3,3-trifluoropropyl radicals, at least 50 mole % of said organic radicals being methyl radicals; and
(F) 0.1 to 7 parts by weight of an organic peroxide.

DETAILED DESCRIPTION OF THE PREFERRED EMBODIMENTS OF THE INVENTION

More particularly according to the present invention, the constituent ($A_1$) is a well known material and is available commercially in an unvulcanized state. EPDM or EPR may be employed either alone or admixed. In general, the constituent ($A_1$) contains various known additives such as reinforcing or extending fillers, plasticizers, pigments, or flame-retardants. However, the amounts of constituents ($A_1$) and ($A_2$) to which reference is made comprehend only the polymers and do not include the additives.

5-Methylene-2-norbornene, 5-ethylidene-2-norbornene, dicyclopentadiene, cyclooctadiene and 1,4-hexadiene are exemplary of dienes employed in the EPDM.

The diorganopolysiloxane resin ($A_2$) has the general formula: $R_{3-a}(R'O)_a SiO(R_2 SiO)_n Si(OR')_a R_{3-a}$ in which the symbols R, which may be identical or different, are $C_1$–$C_8$ hydrocarbon radicals, or substituted such radicals bearing halogen atom or cyano radical substituents, the symbol R' is a hydrogen atom, a $C_1$–$C_4$ alkyl radical, the symbol a is zero or one, the symbol n is a number having a sufficient value to provide the viscosity of at least 1 million mPa.s at 25° C., at least 50% of the number of the radicals R being methyl radicals and 0.005 to 0.5 mole % of the recurring units constituting such resin are selected from among those of the formulae $(CH_2=CH)(R)SiO$ and $(CH_2=CH)R_{2-a}(R'O)_aSiO_{0.5}$.

The symbol R is a $C_1$–$C_8$ hydrocarbon radical, or a substituted such radical bearing halogen atom or cyano radical substituents; more specifically, it includes:

(i) $C_1$–$C_5$ alkyl radicals, or halogen or cyano-substituted such radicals, such as methyl, ethyl, propyl, isopropyl, butyl, isobutyl, pentyl, 3,3,3-trifluoropropyl, gamma-cyanoethyl and gamma-cyanopropyl radicals;

(ii) $C_2$–$C_4$ alkenyl radicals, such as vinyl, allyl and 2-butenyl radicals; and (iii) $C_6$–$C_8$ mononuclear aryl radicals, or halogen substituted such radicals, such as phenyl, chlorophenyl, tolyl and trifluoromethylphenyl radicals.

The $C_1$–$C_4$ alkyl radicals denoted by the symbol R' and more preferably methyl, ethyl, propyl, isopropyl, butyl and secondary butyl radicals.

At least 60% of the number, in particular at least 70% of the radicals denoted by R are preferably methyl radicals.

Furthermore, vinyl radicals are also present, in an appropriate quantity, in the reain ($A_2$); they provide recurring units of the formulae $CH_2=CH(R)SiO$ and $(CH_2=CH)R_{2-a}(R'O)_aSiO_{0.5}$, the number of which represents 0.005 to 0.5 mole %, preferably 0.01 to 0.45 mole %, of the total number of units of the general formulae $R_2SiO$ and $R_{3-a}(RO)_aSiO_{0.5}$ constituting the resin ($A_2$).

Exemplary of the recurring units comprising the resins ($A_2$), representative are those of the formulae:
$(CH_3)_2SiO$,
$CH_3(CH_2=CH)SiO$,
$CH_3(C_6H_5)SiO$,
$(C_6H_5)_2SiO$,
$CH_3(C_2H_5)SiO$,
$CH_3(n—C_3H_7)SiO$,
$(CH_3)_3SiO_{0.5}$,
$(CH_3)_2CH_2=CHSiO_{0.5}$,
$CH_3(C_6H_5)_2SiO_{0.5}$,
$CH_3(C_6H_5)(CH_2=CH)SiO_{0.5}$,
$HO(CH_3)_2SiO_{0.5}$,
$CH_3O(CH_3)_2SiO_{0.5}$,
$C_2H_5O(CH_3)_2SiO_{0.5}$,
$n—C_3H_7O(CH_3)_2SiO_{0.5}$,
$HO(CH_2=CH)(CH_3)SiO_{0.5}$.

The resins ($A_2$) are commercially available from the silicone manufacturers; furthermore, they can easily be produced by employing methods which are well described in the chemical literature.

In the majority of cases, methylvinyldimethylpolysiloxane resins are used containing the recurring units $(CH_3)_2SiO$ and $CH_2=CH(CH_3)SiO$ along their polymer chain, and at the end of the polymer chain are units selected from among those of the formula:
$(CH_3)_2(CH_2=CH)SiO_{0.5}$,
$HO(CH_3)(CH_2=CH)SiO_{0.5}$,
$(CH_3)_2SiO_{0.5}$,
$C_6H_5(CH_3)(CH_2=CH)SiO_{0.5}$,
$HO(CH_3)_2SiO_{0.5}$
of of dimethylpolysiloxane resins blocked at each end of their polymer chain by one of the above units containing a vinyl radical.

These generally have a viscosity of at least 2 million mPa.s at 25° C.

From 90 to 50 parts of ($A_1$) are preferably employed per 10 to 50 parts of ($A_2$).

($A_2$) may be added directly to ($A_1$) or may be premixed with (B), (C), (D) and (E) before being mixed with ($A_1$).

The two compounds (B) and (C) define the thermal protection system for the composition of the invention. This system confers efficient overall thermal behavior on the composition.

The compound (B) having the formula (1) is an essential constituent of the invention.

From 1 to 5 parts of (B) are preferably employed per 100 parts of (A).

(C) is an aromatic compound containing a secondary amine function, also serving as an antioxidant.

The secondary amine function may be included or not in a hydrocarbon nucleus. Compound (C) is preferably a solid at ordinary temperature and may be in the form of a polymer.

As examples of the polymer compounds (C), representative is 2,2,4-trimethyl-1,2-dihydroquinoline which is at least partly polymerized ($C_1$), having the average formula:

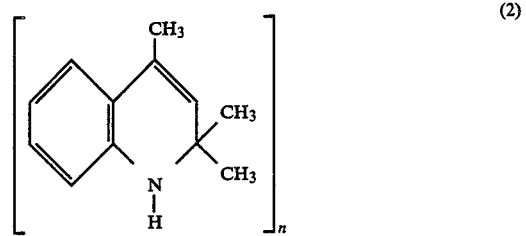

(2)

in which n is an integer generally ranging from 1 to 10, inclusive.

As compound (C), the para-phenylenediamines can also be used, more specifically those of the formula:

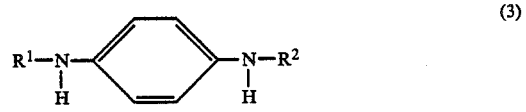

(3)

in which the radicals $R_1$ and $R_2$, which may be identical or different, are each linear or branched chain $C_1$–$C_{20}$ alkyl radicals and phenyl, alkylphenyl or phenylalkyl radicals in which the alkyl moiety is $C_1$–$C_4$.

As examples of compounds corresponding to the formula (3), representative are:

N,N'-Diphenyl-para-phenylenediamine ($C_2$):

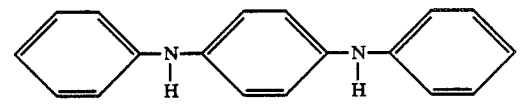

N-Isopropyl-N'-phenyl-para-phenylenediamine ($C_3$):

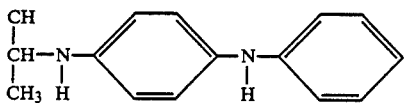

N-(1,3-dimethylbutyl)-N'-phenyl-para-phenylenediamine (C₄):

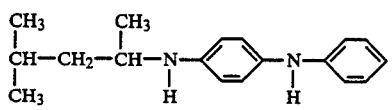

N,N'-diisooctyl-para-phenylenediamine (C₅):

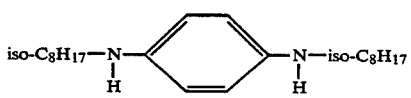

The preferred compound is the product (C₁). From 0.1 to 5 parts of (C) are preferably employed per 100 parts of (A).

The inorganic fillers (D) are intoduced in a proportion of 5 to 200 parts, preferably 7 to 150 parts, per 100 parts of mixture (A).

They usually contain finely divided reinforcing fillers and/or nonreinforcing fillers of coarser particle sizes.

The reinforcing fillers are preferably selected from among the pyrogenic and precipitated silicas. These silicas hve a specific surface area measured according to the BET method of at least 50 m²/g, preferably greater than 70 m²/g, a mean size of the primary particles which are smaller than 80 nanometers and an apparent density below 200 g/liter.

These silicas may be incorporated as such, or after they have been treated with the organosilicon compounds which are usually employed for this purpose. These compounds include methylpolysiloxanes such as hexamethyldisiloxane and octamethylcyclotetrasiloxane, methylpolysilazanes such as hexamethyldisilazane and hexamethylcyclotrisilazane, chlorosilanes such as dimethyldichlorosilane, trimethyl-chlorosilane, methylvinyldichlorosilane and dimethylvinyl-chlorosilane, and alkoxysilanes such as dimethyldimethoxy-silane, dimethylvinylethoxysilane and trimethylmethoxysilane. During this treatment, the silicas may increase their initial weight up to a proportion of 20%, preferably 18%, approximately.

The nonreinforcing fillers consist of inorganic fillers whose mean particle diameter is greater than 100 nanometers.

These fillers are represented more especially by ground quartz, calcined clays, diatomaceous silicas, calcium carbonate, zinc, iron, titanium, magnesium and aluminum oxides, carbon black, magnesium and aluminum silicates, aluminum, calcium and barium sulfates, asbestos and glass and carbon fibers and synthetic, aramide, polyester, polyamide and rayon fibers.

Per 100 parts of mixture (A), there are added from 0.1 to 30 parts of a diorganopolysiloxane oil (E) having a viscosity of from 10 to 5,000, preferably from 50 to 1,000 mPa.s at 25° C., in which the organic radicals are methyl, vinyl, phenyl and 3,3,3-trifluoropropyl radicals, at least 50% of the organic radicals being methyl radicals.

More preferably, the oil (E) has the general formula:

in which the radicals R, which may be identical or different, are methyl, vinyl, phenyl and 3,3,3-trifluoropropyl radicals, g is 0 or 1 and m is an integer having a sufficient value to impart to the polymer (E) a viscosity of from 10 to 5,000 mPa.s at 25° C.

More particularly preferred are the oils (E) in which all the radicals R are methyl and phenyl radicals, in particular trimethylsiloxy-blocked dimethylpolysiloxane oils, α,ω-(dihydroxy)dimethylpolysiloxane oils and trimethylsiloxy-blocked (phenylmethyl)(dimethyl)-polysiloxane oils.

The oils (E) define the systems which render the polymers (A₁) and (A₂) compatible and also contribute to the thermal resistance of the composition.

The organic peroxides (F) are employed in a proportion of 0.1 to 7 parts, preferably 0.2 to 6 parts, per 100 parts of mixture (A). They are well known to the rubber art and include, more especially, benzoyl peroxide, bis(2,4-dichlorobenzoyl)peroxide, dicumyl peroxide, t-butyl perbenzoate, di-t-butyl peroxide and 2,5-bis(tert-butyl-peroxy)-2,5-dimethylhexane.

These various peroxides decompose at temperatures and rates which are sometimes different. They are selected as a function of the required curing conditions.

The compositions according to the invention may additionally comprise, preferably, at least one of the two additives (G) and (H) below:

Per 100 parts of mixture (A), there may be added, if desired, from 0.05 to 5 parts of a silane (G) of the formula:

in which X is methoxy, ethoxy, 2-methoxyethoxy or a 2-ethoxy-ethoxy radical, and c is 1 or 0.

As examples of the silane (G), representative are: methylvinyldiethoxysilane, vinyltrimethoxysilane, vinyltri-ethoxysilane, vinyltri(2-ethoxyethoxy)silane, and vinyltri(2-methoxyethoxy)silane.

Per 100 parts of mixture (A), there may be added, if desired, from 0.5 to 5, preferably from 0.1 to 2 parts, of a silane (H) of the formula:

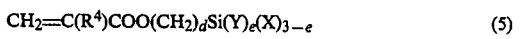

in which R⁴ is H or methyl, d is an integer from 1 to 5, inclusive, Y is methyl or phenyl, X has the definition given in formula (4) above and e is 1 to 0.

Exemplary of these silanes (H), representative are those of the formulae:

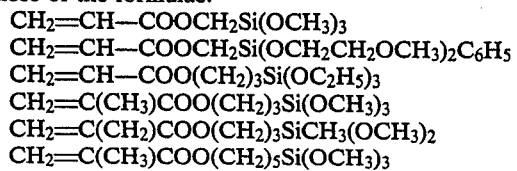

In a preferred embodiment of the invention, it has been found that it is possible to improve the compatibilizing system consisting of the oils (E) by also adding to the composition a silane (G) and/or (H) to further increase the compatibility of the polymers (A₁) and (A₂) and, hence, the thermal resistance of the composition.

The compositions according to the invention may also contain the usual additives such as organic plasticizers, in particular fatty acids and their derivatives, phthalic acid derivatives, lubricating agents, paraffinic oils, blowing agents and anti-UV additives.

Various mixing methods are possible for preparing the compositions of the invention, the order of introduction of the various constituents not being critical, but it is nevertheless desirable to add the constituent (F) last.

The compositions according to the invention are preferably prepared according to either of the processes below:

In a first process, a silicone masterbatch is first prepared using a kneader or preferably a Banbury mixer to mix the constituents (A₂), (D), (E) and, if desired, (G) and (H), and then the silicone masterbatch is added to (A₁) with the aid of a roll mill or preferably a Banbury mixer with the constituents (B) and (C), and (F) is introduced last.

In a second process, a first masterbatch is prepared separately, on the one hand, by mixing, preferably in a Banbury mixer, (A₁) at least a part of (D) and, on the other hand, a second masterbatch by mixing, preferably in a kneader, (A₂), the remainder of the fillers (D) and (E) and, if desired, (G) and (H).

These two masterbatches are homogenized, preferably on a two-roll mill with the addition of (B) and (C) and then finally (F).

Understandably, when the constituent (F) is introduced, care must be taken that the mixing temperature is below the activation temperature of the peroxide in order to avoid a premature initiation of vulcanization.

The compositions according to the invention are vulcanized hot, preferably under pressure, for example at a temperature of 100° to 200° C., of from 2 to 20 mPa.

The compositions according to the invention retain their mechanical properties at elevated temperature and can be employed to produce a large variety of shaped articles such as belts, rollers, tubes and pipes, gaskets, seals, and the like.

In order to further illustrate the present invention and the advantages thereof, the following specific examples are given, it being understood that same are intended only as illustrative and in nowise limitative. In said examples to follow, all parts and percentages are given by weight.

COMPARATIVE EXAMPLES 1 TO 3 AND EXAMPLES 4 TO 6

Description of the constituents employed (A)₁: EPDM marketed by Total Chimie under the trademark EP 657 ®, containing 6% of 5-ethylidene-2-norbornene and 70% of ethylene, (A)₂: (Dimethyl)(methylvinyl)polysiloxane resin blocked by a trimethylsiloxy unit at each of its polymer ends and comprising in its chain 99.8 mole % of dimethylsiloxy units and 0.2 mole % of methylvinylsiloxy units and having a viscosity of $10^7$ mPa.s at 25° C.,

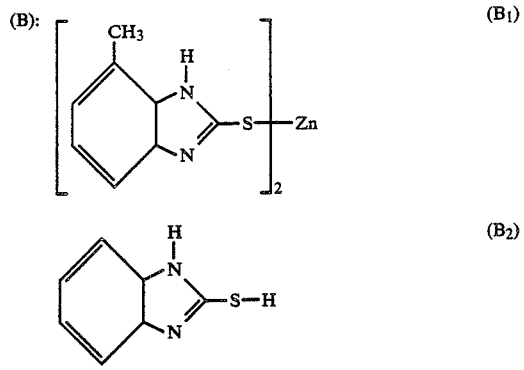

(C):
C₁: Polymerized 2,2,4-trimethyl-1,2-dihydroquinoline, marketed by Vulnax under the trademark Permanax TQ,
C₅: N,N'-diisooctyl-para-phenylenediamine.

(D):
(D₁): Pyrogenic silica having a BET specific surface area of 300 m²/g,
(D₂): Precipitated silica having a BET specific surface of 175 m²/g,
(D₃): Zinc oxide ZnO,
(E): Trimethylsiloxy-blocked methylphenyl-polysiloxane oil having a viscosity of 100 mPa.s at 25° C. containing 10 mole % of phenyl radicals,
(F): Dicumyl peroxide,
(G): Vinyltris(2-methoxyethoxy)silane,
(H): Gamma-methacryloxypropyltrimethoxysilane,
(P): Plasticizer: paraffinic oil.

Mixing of the constituents

MM¹: The constituents (A₁), (D₂), (D₃), (G) and (P) were mixed with a Banbury mixer,
MM₂: The constituents (A₂), (D₁), (E) and (H) were mixed in a kneader.

The two masterbatches MM₁ and MM₂ were homogenized on the 2-roll mill, (B) and (C) were added, and then (F) was added. During this mixing operation, the temperature did not exceed 90° C.

The catalyzed composition was pressed and vulcanized for 10 minutes at 170° C. under a pressure of 15 mPa to produce plaques 2 mm in thickness which were reheated in a ventilated oven for two hours at 150° C.

These plaques were used to produce standardized test specimens on which the following properties were measured:

(i) Shore hardness A (SHA) according to the ASTM standard D-2240,
(ii) tensile stength (TS) according to the AFNOR standard T 46 002 corresponding to the ASTM standard D 412 in mPa,
(iii) elongation at break (EB) in % according to the above AFNOR standard T 46 002, and
(iv) the tear strength (TrS) according to ASTM standard D 624 in kN/m.

Another batch of test specimens reheated for two hours at 150° C. was treated in a ventilated oven for 72 hours at 200° C. and the same mechanical properties as above were measured, and then the changes in the mechanical properties were calculated, in %, relative to the values obtained at 150° C.

The results are reported in Tables I and II below, Table I giving the composition of the test specimens of Examples 1 to 6 and Table II giving the mechanical properties.

TABLE I

| EXAMPLES | 1 | 2 | 3 | 4 | 5 | 6 |
|---|---|---|---|---|---|---|
| A1 | 70 | 70 | 70 | 70 | 80 | 80 |
| A2 | 30 | 30 | 30 | 30 | 20 | 20 |
| B1 | 0 | 1.8 | 2.5 | 1.8 | 0 | 2.5 |
| B2 | 0 | 0 | 0 | 0 | 2.5 | 0 |
| C1 | 0 | 0.5 | 0.5 | 0.5 | 0.5 | 0.5 |
| C5 | 0 | 0 | 0 | 0 | 1 | 1 |
| D1 | 7 | 7 | 7 | 7 | 5 | 5 |
| D2 | 30 | 30 | 30 | 30 | 50 | 50 |
| D3 | 3 | 3 | 3 | 3 | 3 | 3 |
| E | 0 | 0 | 0 | 6 | 6 | 6 |
| F | 1.5 | 1.5 | 1.5 | 1.5 | 1.5 | 1.5 |
| G | 1 | 1 | 1 | 1 | 1 | 1 |
| H | 0.2 | 0.2 | 0.2 | 0.2 | 0.1 | 0.1 |
| P | 20 | 20 | 20 | 20 | 25 | 25 |

TABLE II

| EXAMPLES | | 1 | 2 | 3 | 4 | 5 | 6 |
|---|---|---|---|---|---|---|---|
| 2 h at 150° C. | (SHA) | 66 | 65 | 66 | 62 | 69 | 69 |
| | (TS) | 10.0 | 11.0 | 10.0 | 8.3 | 12.9 | 11.4 |
| | (EB) | 400 | 600 | 550 | 610 | 490 | 440 |
| | (TrS) | 26 | 32 | 30 | 33 | 40 | 43 |
| 72 h at 200° C. | (SHA) | 88 | 78 | 78 | 63 | 74 | 73 |
| | (TS) | 2.2 | 3.2 | 5.0 | 8.4 | 8.0 | 10.8 |
| | (EB) | 25 | 50 | 100 | 475 | 252 | 262 |
| | (TrS) | 10 | 12 | 14 | 33 | 25 | 26 |
| Δ SHA | (%) | +22 | +13 | +12 | +1 | +5 | +4 |
| Δ TS | (%) | −78 | −70 | −50 | −2 | −38 | −5 |
| Δ EB | (%) | −94 | −91 | −82 | −22 | −49 | −40 |
| Δ TrS | (%) | −62 | −62 | −53 | −0 | −37 | −40 |

Comparative Example 1 illustrates the advantage of employing the additives B1, C1 and E.

Comparative Examples 2 and 3 demonstrate the need for the use of the additive E.

COMPARATIVE EXAMPLES 7, 8 AND 9

In these examples the starting composition was the same as in Example 6, except that compound C1 was replaced with an equal quantity of a phenolic antioxidant, 2,6-di-tert-butyl-para-cresol (Example 7), 2,2′-methylenebis(4-methyl-6-tert-butylphenol) (Example 8) and bis-2,2′-methyl-enebis(4-methyl-6-tert-butylphenol terephthalate (Example 9).

It appeared that the products of Examples 7 to 9 vulcanized correctly and gave mechanical properties comparable to those obtained in Example 6 after two hours of heat treatment at 150° C.

However, after 240 hours of heating at 180° C., the products because friable and brittle.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A rubber/silicone composition of matter, comprising:
    (A) 100 parts of a mixture of:
       (A₁) 95 to 30 parts of an ethylene-propylene-diene terpolymer or an ethylene-propylene copolymer, or admixture thereof, and
       (A₂) 5 to 70 parts of a diorganopolysiloxane resin having a viscosity of at least $10^6$ mPa.s at 25° C.;
    (B) 0.5 to 10 parts of a compound of the formula:

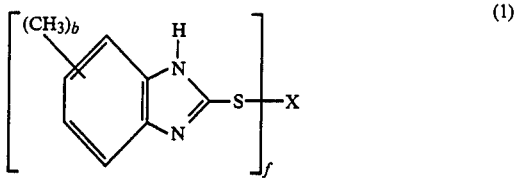

in which b=0 or 1, X is a metal cation or the hydrogen atom, f is an integer ranging from 1 to 3 and is equal to the number of positive charges borne by the cation, and f=1 if X is the hydrogen atom;
    (C) 0.1 to 10 parts of an aromatic secondary amine compound;
    (D) 5 to 200 parts of an inorganic filler material;
    (E) 0.1 to 30 parts of a diorganopolysiloxane oil having a viscosity of from 10 to 5,000 mPa.s at 25° C., in which the organic radicals are methyl, vinyl, phenyl or 3,3,3-trifluoropropyl radicals, at least 50 mole % of the organic radicals being methyl radicals; and
    (F) 0.1 to 7 parts of an organic peroxide.

2. The rubber/silicone composition as defined by claim 1, said aromatic amine compound comprising an at least partially polymerized 2,2,4-trimethyl-1,2-dihydroquinoline or a para-phenylenediamine.

3. The rubber/silicone composition as defined by claim 1, wherein said compound (B) having the formula (1), X is zinc and f=2.

4. The rubber/silicone composition as defined by claim 1, said oil (E) having the general formula:

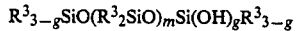

in which the radicals R, which may be identical or different, are each methyl, vinyl, phenyl or 3,3,3-trifluoropropyl radicals, g is 0 or 1 and m is an integer having a value such as to provide a polymer (E) having a viscosity of from 10 to 5,000 mPa.s at 25° C.

5. The rubber/silicone composition as defined by claim 4, wherein said polymer (E) the radicals R are methyl or phenyl radicals.

6. The rubber/silicone composition as defined by claim 1, further comprising, per 100 parts of mixture (A), from 0.05 to 5 parts of a silane (G) of the formula:

in which X is a ethoxy, 2-methoxyethoxy or 2-ethoxyethoxy radical, and c is 1 or 0.

7. The rubber/silicone composition as defined by claim 1, further comprising, per 100 parts of mixture (A), from 0.05 to 5 parts of a silane (H) of the formula:

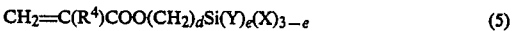

in which R⁴ is H or methyl, d is an integer of from 1 to 5, Y is methyl or phenyl, X is a methoxy, ethoxy, 2-methoxyethoxy or 2-ethoxyethoxy radical, and e is 1 or 0.

8. The rubber/silicone composition as defined by claim 1, said filler material (D) comprising a pyrogenic or precipitated silica.

9. A shaped article comprising the rubber/silicone composition as defined by claim 1.

10. The shaped article as defined by claim 9, in cured state.

* * * * *